US011887310B2

(12) United States Patent
Jagadeesh et al.

(10) Patent No.: US 11,887,310 B2
(45) Date of Patent: Jan. 30, 2024

(54) INTERACTIVE IMAGE SEGMENTATION

(71) Applicant: Apple Inc., Cupertino, CA (US)

(72) Inventors: Vignesh Jagadeesh, San Jose, CA (US); Atila Orhon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 585 days.

(21) Appl. No.: 17/078,086

(22) Filed: Oct. 22, 2020

(65) Prior Publication Data

US 2021/0358127 A1 Nov. 18, 2021

Related U.S. Application Data

(60) Provisional application No. 63/025,886, filed on May 15, 2020.

(51) Int. Cl.
*G06T 7/00* (2017.01)
*G06T 7/11* (2017.01)
*G06T 7/10* (2017.01)
*G06F 17/18* (2006.01)
*G06N 20/00* (2019.01)
*G06N 3/047* (2023.01)
*G06V 10/762* (2022.01)
*G06V 10/77* (2022.01)
*G06V 10/82* (2022.01)

(52) U.S. Cl.
CPC .............. *G06T 7/11* (2017.01); *G06F 17/18* (2013.01); *G06N 3/047* (2023.01); *G06N 20/00* (2019.01); *G06T 7/10* (2017.01); *G06V 10/763* (2022.01); *G06V 10/7715* (2022.01); *G06V 10/82* (2022.01)

(58) Field of Classification Search
CPC ............. G06T 7/10; G06T 9/00; G06T 7/187; G06N 20/00; G06N 3/04; G06N 3/0472; G06F 17/18
See application file for complete search history.

(56) References Cited

U.S. PATENT DOCUMENTS 11,507,777 B2 * 11/2022 Amirghodsi .......... G06F 18/214

OTHER PUBLICATIONS

Barron et al., "The Fast Bilateral Solver," ECCV, Jul. 2016, retrieved from https://arxiv.org/pdf/1511.03296.pdf, 50 pages.

(Continued)

*Primary Examiner* — Tuan H Nguyen
(74) *Attorney, Agent, or Firm* — BAKERHOSTETLER

(57) ABSTRACT

A first subset of pixels of an image may be labeled with an object identifier based on user interactions with the image. Pixel data representing the pixels of the image may be passed through an embedding neural network model to generate pixel embedding vectors. A prototype embedding vector associated with the object identifier may be generated based pixel embedding vectors corresponding to the first subset of pixels. For each pixel of a second subset of pixels of the image, a probability that the pixel should be labeled with the object identifier may be determined based on the prototype embedding vector and pixel embedding vectors corresponding to the second subset of pixels. Pixels of the second subset of pixels may be labeled with the object identifier based on the determined probabilities, and the pixels in the image may be segmented based on the pixels labeled with the object identifier.

20 Claims, 6 Drawing Sheets

(56) References Cited

OTHER PUBLICATIONS

Caelles, et al., "The 2018 Davis Challenge On Video Object Segmentation," Mar. 2018, retrieved from https://arxiv.org/pdf/1803.00557.pdf, 4 pages.

Chen, et al., "Blazingly Fast Video Object Segmentation With Pixel-Wise Metric Learning," In Computer Vision and Pattern Recognition (CVPR), Apr. 2018, retrieved from https://arxiv.org/pdf/1804.03131.pdf, 10 pages.

Chen, "Rethinking atrous convolution for semantic image segmentation," Dec. 2017, retrieved from http://arxiv.org/abs/1706.05587, 14 pages.

Deng, et al., "ImageNet: A Large-Scale Hierarchical Image Database," CVPR09, 2009. 2 pages.

Dong et al., "Few-shot Semantic Segmentation With Prototype Learning," BMVC, 2018. 13 pages.

Everingham, et al., "The Pascal Visual Object Classes Challenge: A Retrospective," International Journal of Computer Vision, 111(1):98-136, Jan. 2015, 38 pages.

Finn, et al., "Model-Agnostic Meta-Learning For Fast Adaptation Of Deep Networks," Proceedings of the 34th International Conference on Machine Learning, vol. 70 of Proceedings of Machine Learning Research, pp. 1126-1135, International Convention Centre, Sydney, Australia, Aug. 6-11, 2017. PMLR. Retrieved from http://proceedings.mlr.press/v70/finn17a/finn17a.pdf, 10 pages.

He, et al., "Deep Residual Learning For Image Recognition," Dec. 2015, retrieved from http://arxiv.org/abs/1512.03385, 12 pages.

He, et al., "Mask R-CNN," IEEE Trans. Pattern Anal. Mach. Intell., 42(2):386-397, 2020. doi: 10.1109/TPAMI.2018.2844175. URL https://doi.org/10.1109/TPAMI.2018.2844175.

Hu, et al., "Learning to Segment Every Thing," In CVPR, Mar. 2018 retrieved from https://arxiv.org/pdf/1711.10370.pdf, 9 pages.

Ioffe et al., "Batch Normalization: Accelerating Deep Network Training By Reducing Internal Covariate Shift," Proceedings of the 32nd International Conference on International Conference on Machine Learning—vol. 37, ICML'15, pp. 448-456. JMLR.org, Mar. 2015, retrieved from https://arxiv.org/pdf/1502.03167.pdf, 11 pages.

Kingma et al., "A Method For Stochastic Optimization," ICLR 2015, Jan. 2015, retrieved from https://arxiv.org/pdf/1412.6980.pdf, 15 pages.

Lake, et al., "One Shot Learning Of Simple Visual Concepts," 2011, retrieved from https://cims.nyu.edu/~brenden/LakeEtAl2011CogSci.pdf, 6 pages.

Li, et al., "Meta-SGD: Learning To Learn Quickly For Few Shot Learning," Sep. 2017 retrieved from http://arxiv.org/abs/1707.09835, 11 pages.

Lin, et al., "Microsoft COCO: Common Objects In Context," Feb. 2014 retrieved from http://arxiv.org/abs/1405.0312, 15 pages.

Liu, et al., "Learning to Propagate Labels: Transductive Propagation Network for Few-Shot Learning," International Conference on Learning Representations, Feb. 2019, retrieved from https://arxiv.org/pdf/1805.10002.pdf, 14 pages.

Liu, et al., "On The Variance Of The Adaptive Learning Rate And Beyond," ICLR 2020, Apr. 2020, retrieved from https://arxiv.org/pdf/1908.03265.pdf, 14 pages.

Maninis, et al., "Video Object Segmentation Without Temporal Information," IEEE Transactions on Pattern Analysis and Machine Intelligence (TPAMI), May 2018, retrieved from https://arxiv.org/pdf/1709.06031.pdf, 15 pages.

Metz, et al., "Learning Unsupervised Learning Rules," International Conference on Learning Representations, Feb. 2019, retrieved from https://arxiv.org/pdf/1804.00222.pdf, 27 pages.

Michaelis, et al., :One-shot Instance Segmentation, May 2018, retrieved from http://arxiv.org/abs/1811.11507, 20 pages.

Nichol, et al., "On First-Order Meta-Learning Algorithms," Oct. 2018, retrieved from http://arxiv.org/abs/1803.02999, 15 pages.

Oreshkin, et al., "Tadam: Task Dependent Adaptive Metric For Improved Few-Shot Learning," Advances in Neural Information Processing Systems 31, pp. 721-731, 2018, http://papers.nips.cc/paper/7352-tadam-task-dependent-adaptive-metric-for-improved-few-shot-le38a0rning.pdf, 11 pages.

Perez, et al., "FILM: Visual Reasoning with a General Conditioning Layer," AAAI, Dec. 2018, retrieved from https://arxiv.org/pdf/1709.07871.pdf, 13 pages.

Pont-Tuset, et al., "The 2017 Davis Challenge On Video Object Segmentation," Mar. 2017, retrieved from https://arxiv.org/pdf/1704.00675.pdf, 6 pages.

Raghu, et al., "Rapid Learning or Feature Reuse? Towards Understanding the Effectiveness of MAML," Feb. 2019, retrieved from https://arxiv.org/pdf/1909.09157.pdf, 21 pages.

Ravi et al., "Optimization as a Model For Few-Shot Learning," 5th International Conference on Learning Representations, ICLR 2017, Toulon, France, Apr. 24-26, 2017, Conference Track Proceedings, 2017, retrieved from https://openreview.net/pdf?id=rJY0-Kcll, 11 pages.

Reddi, et al., "On the Convergence of Adam and Beyond," International Conference on Learning Representations, 2018, https://openreview.net/forum?id=ryQu7f-RZ, 23 pages.

Ren, et al., "Meta-Learning For Semi-Supervised Few-Shot Classification," International Conference on Learning Representations, Mar. 2018, retrieved from https://openreview.net/forum?id=HJcSzz-CZ, 15 pages.

Rusu, et al., "Meta-Learning With Latent Embedding Optimization," International Conference on Learning Representations, Mar. 2019, retrieved from https://openreview.net/forum?id=BJgklhAcK7, 17 pages.

Shaban, et al., "One-shot Learning For Semantic Segmentation," Proceedings of the British Machine Vision Conference (BMVC), pp. 167.1-167.13. BMVA Press, Sep. 2017. ISBN 1-901725-60-X. doi: 10.5244/C.31.167. URL https://dx.doi.org/10.5244/C.31.167, 17 pages.

Snell, et al., "Prototypical Networks For Few-Shot Learning," Advances in Neural Information Processing Systems 30, pp. 4077-4087, 2017, retrieved from http://papers.nips.cc/paper/6996-prototypical-networks-for-few-shot-learning.pdf.

Sun, et al., "Meta-Transfer Learning For Few-Shot Learning," The IEEE Conference on Computer Vision and Pattern Recognition (CVPR), Apr. 2019, retrieved from https://arxiv.org/pdf/1812.02391.pdf, 14 pages.

Triantafillou, et al., "Meta-Dataset: A Dataset Of Datasets For Learning To Learn From Few Examples," Apr. 2019, retrieved from http://arxiv.org/abs/1903.03096, 24 pages.

Vapnik, "An overview of statistical learning theory," Trans. Neur. Netw., 10(5):988-999, Sep. 1999, retrieved from https://doi.org/10.1109/72.788640, 12 pages.

Vinyals, et al., "Matching Networks For One Shot Learning," Advances in Neural Information Processing Systems 29, pp. 3630-3638 Dec. 2016, retrieved from http://papers.nips.cc/paper/6385-matching-networks-for-one-shot-learning.pdf, 12 pages.

Wang, et al., "Panet: Few-Shot Image Semantic Segmentation With Prototype Alignment," The IEEE International Conference on Computer Vision (ICCV), Oct. 2019, 10 pages.

Wertheimer et al., "Few-Shot Learning With Localization In Realistic Settings," Computer Vision and Pattern Recognition (CVPR), 2019, 12 pages.

Zhang, et al., SG-One: Similarity Guidance Network For One-Shot Semantic Segmentation, 2018, retrieved from http://arxiv.org/abs/1810.09091, 11 pages.

Zhou, et al., "Learning With Local And Global Consistency," Advances in Neural Information Processing Systems 16, pp. 321-328. MIT Press, 2004. URL http://papers.nips.cc/paper/2506-learning-with-local-and-global-consistency.pdf, 8 pages.

\* cited by examiner

INTERACTIVE IMAGE SEGMENTATION

CROSS REFERENCE TO RELATED APPLICATIONS

This application claims the benefit of priority to U.S. Provisional Patent Application No. 63/025,886, entitled "Interactive Image Segmentation," filed on May 15, 2020, the disclosure of which is hereby incorporated herein in its entirety.

TECHNICAL FIELD

The present description generally relates to image processing and more particularly to image segmentation using neural networks.

BACKGROUND

Neural networks are used for various image analysis tasks, such as classification, detection, and segmentation. However, training neural networks for new image analysis tasks often involves large amounts of training data and training iterations. Efforts to train the neural networks using smaller amounts of training data and fewer training iterations run the risk of overfitting.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
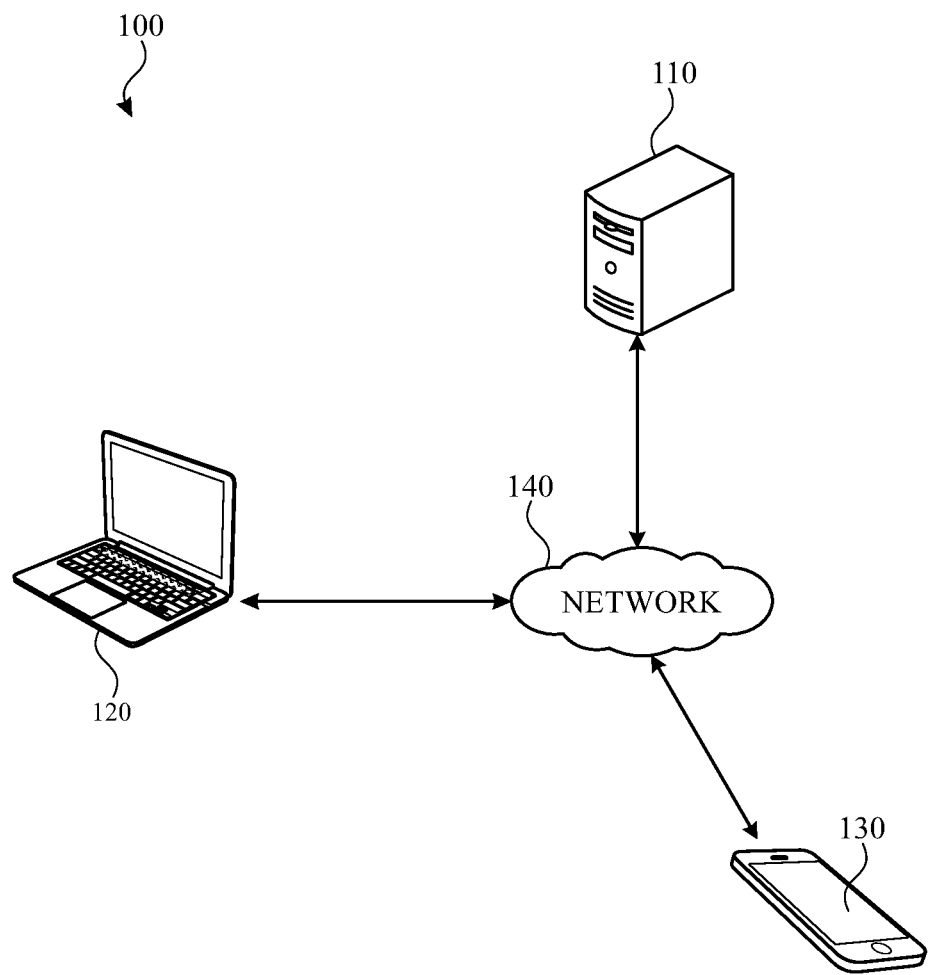
FIG. 1 illustrates an example network environment according to aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology leverages initialization-based meta-learning algorithms to meta-train metric-based algorithms for few-shot learning of new image segmentation tasks. Metric-based meta-learning algorithms are designed to learn an embedding function that is used with a support dataset to determine decision boundaries in an embedding space to correctly classify a query dataset. Few-shot learning refers to the use of a relatively small number of labeled examples to learn a new task. For example, a few images or even a single image from a new category may be used to train a network model to classify other images into the new category. In the context of image segmentation, a few labeled pixels corresponding to an object in an image may be used to train a neural network implementing an embedding function of a metric-based meta-learning algorithm. The trained neural network may then be used to identify other pixels in the image to label as corresponding to the object to facilitate segmentation of the object in the image.

Meta-learning involves a nested optimization scheme comprising an outer loop and an inner loop. Used in the outer loop, initialization-based meta-learning algorithms are designed to learn model parameters as a shared initialization across a distribution of tasks. As part of the inner loop, a neural network model initialized with these learned model parameters can be trained for a particular task within the distribution of tasks with orders of magnitude fewer training iterations than standard learning neural network models. The outer loop learning or training may be referred to as meta-training as the outer loop trains a network model to be trainable for a similar task distribution upon deployment of the network model. Accordingly, meta-training a metric-based algorithm using an initialization-based meta-learning algorithm allows an embedding function to be adapted to a specific task, such as segmenting novel objects within a new image, after a relatively small number of training iterations (e.g., 4 or 10).

The initialization-based meta-learning algorithms may be executed offline to determine the initialization for model parameters and the initialized metric-based meta-learning algorithms may be deployed for online use, such as when a user is viewing an image on a computing device. The user may provide a supervisory signal by selecting or touching one or more pixels in the image displayed on a graphical user interface to label the pixels to identify one or more objects to which the selected or touched pixels correspond. Segmenting the one or more objects in the image becomes a particular task for which the initialized metric-based meta-learning algorithm is adapted over a relatively small number of iterations to facilitate real-time segmentation of the one or more objects in the image. Because the adaptation of the initialized metric-based meta-learning algorithm operates using pixels of the displayed image over a relatively small number of iterations, real-time segmentation of images can be done with fewer processing resources and less data than conventional algorithms might employ and therefore implemented on a wider variety of computing devices.

The subject technology is not limited to any particular initialization-based meta-learning algorithm or metric-based meta-learning algorithm. For example, aspects of the subject technology may incorporate, Reptile, a first-order gradient-based meta-learning algorithm as the initialization-based meta-learning algorithm. Aspects of the subject technology may incorporate prototypical networks for the metric-based meta-learning algorithm.

According to aspects of the subject technology, a first subset of pixels of an image may be labeled with a first object identifier based on labeling information associated with the image. For each pixel of a second subset of pixels of the image, a probability may be determined that the pixel should be labeled with the first object identifier based on the first subset of the pixels and one or more pixels in the second subset of pixels may be labeled with the first object identifier based on the determined probabilities. The pixels in the image may be segmented into a plurality of segments based on the pixels of the image labeled with the first object identifier. The labeling information may be based on user interactions with the image that may include user contact points with a graphical user interface displaying the image, where the first subset of pixels corresponds to pixels in the displayed image coincident with the user contact points.

The probability that a pixel should be labeled with the first object identifier may be determined by passing pixel data representing the pixels of the image through an embedding neural network model comprising meta-learned initialized parameters to generate a plurality of pixel embedding vectors corresponding to the pixels of the image and generating a first prototype embedding vector associated with the first object identifier based on pixel embedding vectors corresponding to the first subset of pixels. The probability that an unlabeled pixel should be labeled with the first object identifier is determined for each pixel of the second subset of pixels based on the first prototype embedding vector and pixel embedding vectors corresponding to the second subset of pixels. Generating the first prototype embedding vector associated with the first object identifier may further include generating an initial prototype embedding vector based on the pixel embedding vectors corresponding to the first subset of pixels and updating the initial prototype embedding vector based on the pixel embedding vectors corresponding to the second subset of pixels to generate the first prototype embedding vector.

The parameters of the embedding neural network model may be updated based on a loss function associated with the determined probabilities for the second subset of pixels. The pixel data may be passed through the embedding neural network model with the updated parameters and the steps of generating a first prototype embedding vector, and determining a probability for each pixel of the second subset of pixels are repeated. The one or more pixels in the second subset of pixels may be labeled with the first object identifier after the repeating of the steps.

A third subset of the pixels may be labeled with a second object identifier based on the user interactions with the image. A second prototype embedding vector associated with the second object identifier may be generated based on pixel embedding vectors corresponding to the third subset of pixels. For each pixel of a second subset of pixels of the image, a probability may be determined that the pixel should be labeled with the second object identifier based on the second prototype embedding vector and the embedded vectors corresponding to the second subset of the pixels. The one or more pixels in the second subset pixels may be labeled with either the first object identifier or the second object identifier based on the determined probabilities, and the pixels in the image are segmented into the plurality of segments based on the pixels in the image labeled with the first object identifier and the second object identifier.

For each of a first number of loops a labeled image may be selected from a set of training images; a first subset of pixels of the selected training image and a second subset of pixels of the selected training image may be designated, wherein labels associated with the second subset of pixels are hidden; pixel data representing the pixels of the training image may be passed through the embedding neural network model to generate a plurality of pixel embedding vectors corresponding to the pixels of the training image; a training prototype embedding vector associated with a training label associated with the first subset of pixels may be generated based on pixel embedding vectors corresponding to the first subset of pixels of the training image; for each pixel of the second subset of pixels, a probability that the pixel should be labeled with the training label based on the training prototype embedding vector may be determined; and the parameters of the embedding neural network model may be updated based on the determined probabilities in order to maximize the probability of correct label assignments in subsequent loops or iterations. The selecting, designating, passing, generating, determining, and updating steps above may be repeated for a second number of loops. The initialized parameters for the embedding neural network model may be generated based on a set of parameters updated in each of the first number of loops. For each loop of the first number of loops a percentage of the total number of pixels of the selected training image designated for the first subset of pixels may be different from a percentage applied during another loop of the first number of loops.

An initialized embedding neural network model facilitates rapid adaptation of the model to a novel image segmentation task defined by user interactions with a displayed image. The model parameters may be updated to the defined image segmentation task using orders of magnitude fewer training iterations than in conventional model learning processes. For example, the model parameters for the defined image segmentation task may be determined in ten or four iterations rather than hundreds or thousands of iterations. This rapid adaptation can provide a near real-time experience for the user in segmenting an image based on the user identifying the objects to be segmented in the image. The user-labeled pixels in the displayed image are used for few-shot learning algorithms and therefore reduce the amount of data needed on a particular computing device to train or adapt the model and fewer training iterations reduces the amount of processing cycles consumed.

FIG. 1 illustrates an example network environment 100 according to aspects of the subject technology. Not all of the depicted components may be used in all implementations, however, and one or more implementations may include additional or different components than those shown in the figure. Variations in the arrangement and type of the components may be made without departing from the scope of the claims as set forth herein. Additional components, different components, or fewer components may be provided.

The network environment 100 includes server 110, computing device 120, and computing device 130. Network 140 may communicatively (directly or indirectly) couple server 110 and computing devices 120 and 130. Network 140 is not limited to any particular type of network, network topology, or network media. Network 140 may be a local area network or a wide area network. Network 140 may be an interconnected network of devices that may include, or may be communicatively coupled to, the Internet. For explanatory purposes, the network environment 100 is illustrated in FIG. 1 as including the server 110 and the computing devices 120 and 130. However, the network environment 100 may include any number of electronic devices and any number of servers. Computing device 120 is depicted as a laptop computer and computing device 130 is depicted as a smartphone. The subject technology is not limited to these embodiments of computing devices. Server 110 and computing devices 120 and 130 may include all or part of the components of the system described below with respect to FIG. 5.

Server 110 may provide a system for initializing parameters for neural network models according to the techniques described herein. Server 110 may deploy the initialized neural network models to computing devices 120 or 130 for adaptation and application of the initialized neural network models to new tasks, such as image segmentation. The deployment may be via network 140 or through other transfer mechanisms. The initialization of parameters is not limited to server 110 and also may be performed by computing devices 120 and/or 130.

Figure 2:
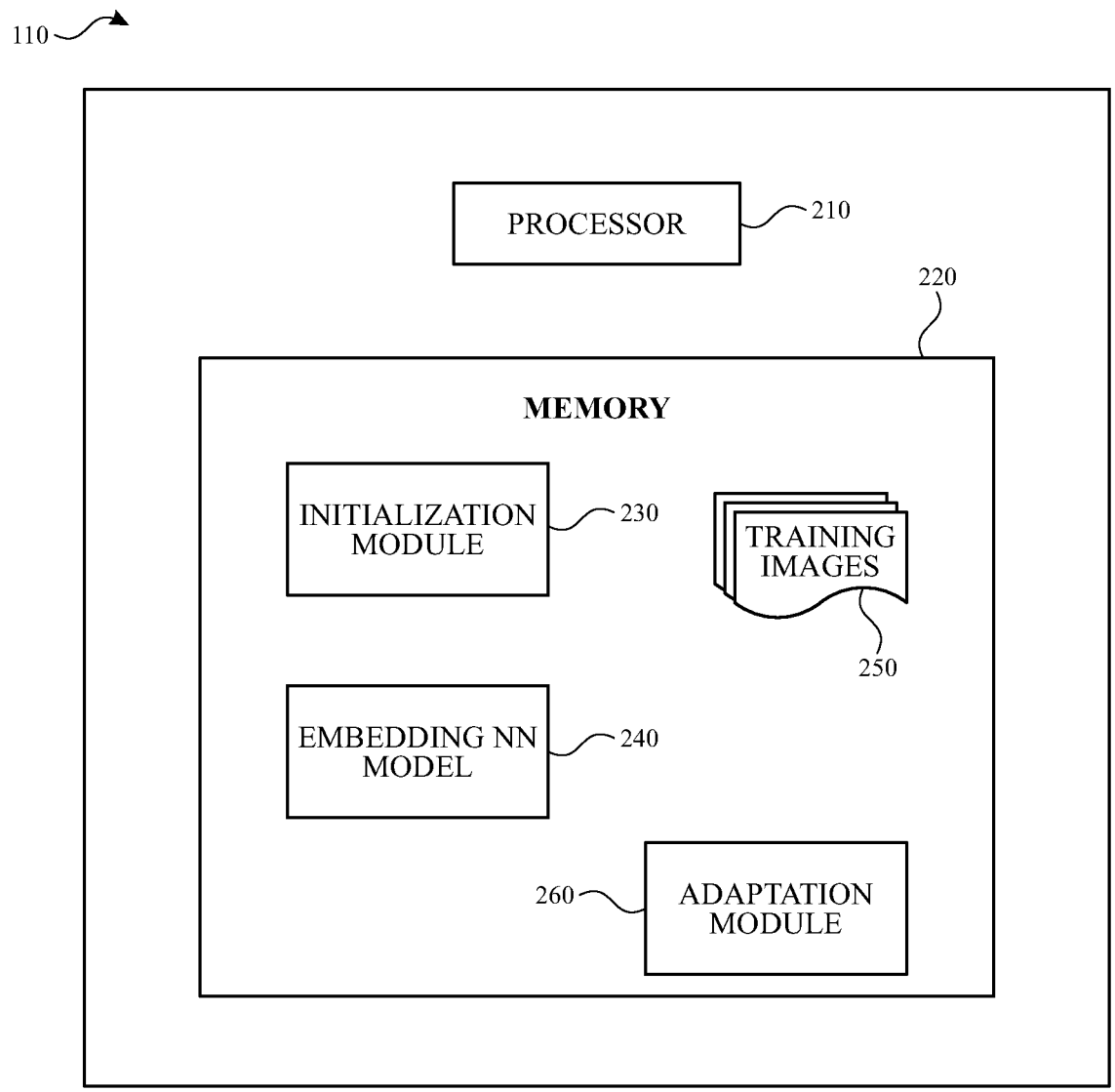
FIG. 2 illustrates an example computing architecture for a system providing initialization and/or adaptation of a neural network model for image segmentation according to aspects of the subject technology.

FIG. 2 is a block diagram illustrating components of server 110 used in training and utilizing a neural network model for interactive image segmentation. While the components are being described as being part of server 110, some or all of the components may be implemented on other systems such as computing devices 120 and 130. For example, server 110 may not include adaptation module 260 and computing device 130 may not include initialization module 230 or training images 250. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, server 110 includes processor 210 and memory 220. Examples of processor 210 and memory 220 are provided below in connection with FIG. 5. Memory 220 may contain initialization module 230, embedding neural network (NN) model 240, training images 250, and adaptation module 260. Initialization module 230 represents code comprising one or more sequences of instructions executable by processor 210 to implement the model parameter initialization processes described herein. Initialization module 230 may use training images 250 to initialize parameters for embedding NN model 240. Training images 250 represent data sets of labeled images that are curated for different types of segmentation tasks. For example, the training images may be labeled for instance segmentation, semantic segmentation, panoptic segmentation, or any other type of segmentation that can be defined using labels on a sub-image level (e.g., pixel labeling). The labeling may include an identifier for an object, a class, or a classification.

According to aspects of the subject technology, initialization module 230 is configured to implement the Metric Meta-Learning Algorithm outlined below to generate model parameters for initializing an embedding neural network model.

---

Metric Meta-Learning Algorithm

Require: Meta-training dataset $\mathbb{S}^{meta-train} \in \mathcal{T}$
Require: Optimizer hyperparameters: meta-learning rate $\alpha$, learning rate $\eta$
Require: Number of inner loop steps H, number of tasks in meta-batch M
Require: Model parameters: $\phi_{o',i'}$, where o' indexes the outer loop and i' indexes the inner loop
1:   while not converged for outer loop step o' do
2:     Initialize set $\mathbb{P}$   ▶ to hold task minimizer parameters
3:     for number of tasks in meta-batch M do
4:       Sample task $\mathcal{T}_j \sim \mathbb{S}^{meta-train}$
5:       for i' in 0..H do
6:         Compute metric learning loss J ($\phi$)
7:         Take inner loop optimization step
$$\phi_{o',i'+1} = \phi_{o',i'} - \eta \cdot \frac{\delta J(\phi)}{\delta \phi}$$
8:       end for
9:       Save task minimizer for $\mathcal{T}_j$, as $\phi_{o'+1,0}$ $\phi_{o',N}$ into parameter set $\mathbb{P}$
10:     end for
11:     Let outer loop gradient be $g_M = \text{mean}(\mathbb{P}) - \phi_{o',0}$
12:     Take outer loop optimization step $\phi_{o'+1,0} = \phi_{o',0} - \alpha \cdot + g_M$
13:   end while

---

The Algorithm utilizes episodic training in which an outer loop randomly samples tasks from a task distribution $\mathcal{T}$, while an inner loop learns the current task in one or more training iterations. For image segmentation tasks, each image may represent a segmentation task of segmenting one or more objects within the image. The training images comprise curated image sets where the pixels within the images are individually labeled for a type of segmentation consistent across a curated image set. For example, the pixels may be labeled individually with an object identifier that identifies the object that is made up of pixels sharing the same object identifier. An image may include more than one object and therefore have multiple object identifiers labeling the pixels within the image. Different curated image sets may include image sets where the pixels within the images are labeled for different types of segmentation, such as segmenting each instance of an object within the image (instance segmentation), segmenting all objects of the same class (semantic segmentation), segmenting object instances and scene segments such as sky and foliage (panoptic segmentation), or any other type of segmentation that can be represented with labeled data.

The inner loop splits the dataset $\mathbb{D}$ of the sampled task into $\mathbb{D}^{support}$ and $\mathbb{D}^{query}$, which splits the pixels of an image into the two sub datasets. All of the pixels in the training images may be fully labeled and represented as $(x_i, y_i)$ where $x_i$ represents pixel data (e.g., RGB values) for a given pixel and $y_i$ represents the corresponding label or object identifier for a training label. $\mathbb{D}_c \subset \mathbb{D}$ denotes the subset of pixels that share the same label or object identifier for the class or object c. $\mathbb{D}^{support}$ is made up of pairs of pixels and corresponding labels. $\mathbb{D}^{query}$ on the other hand needs to be made up of unlabeled pixels for the training algorithm. According to aspects of the subject technology, a percentage of randomly selected pixels may have their labels hidden to make up the sub dataset $\mathbb{D}^{query}$. Different percentages may be used for different sampled tasks. By increasing the percentage for subsequent inner loops, the embedding neural network model may be trained better for few-shot learning using smaller and smaller support sets. For example, the first loop may mask or hide 50% of the pixel labels. Subsequent loops may progressively increase the percentage of pixel labels to mask or hide to 99.9% or until only a single pixel label is maintained.

Using the metric-based prototypical networks approach mentioned above, a prototype embedding vector $z_c$ may be determined for each class or object using the following equation:

$$z_c = \frac{1}{|\mathbb{D}_c^{support}|} \sum_{(x_i, y_i) \in \mathbb{D}_c^{support}} f_\phi(x_i) \quad (1)$$

$f_\phi$ represents a similarity metric or embedding function implemented with the embedding neural network model. $f_\phi$ embeds a vector containing pixel data for a given pixel into an embedding space. The embedding space dimensionality may be the same as the input dimensionality or it may be different.

Given a distance function d: $\mathbb{R}^D \times \mathbb{R}^D \to [0, +)$, a distribution over all classes or object identifiers may be determined for each pixel $x \in \mathbb{D}^{query}$ using the following equation:

$$p_\phi(y = c|x) = \frac{\exp(-d(f_\phi(x), z_c))}{\sum_{c' \in \mathbb{C}} \exp(-d(f_\phi(x), z_{c'}))} \quad (2)$$

A metric learning loss $J(\phi)$ may then be determined using the following equation:

$$J(\phi) = -\Sigma_{x_i, y_i \in \mathbb{D}^{query}} \log(p_\phi(y_i = c|x_i)) \quad (3)$$

The metric learning loss $J(\phi)$ may be used in the inner loop optimization step noted in the Algorithm above to update test parameters of the model.

The number of inner loop steps H and the number of tasks in meta-batch M are not limited to any particular values. As the number of inner loop steps H also may represent the number of iterations that will be performed when the initialized embedding neural network model is adapted to a new image segmentation task, the number chosen may be relatively small, such as four. The number of tasks in meta-batch M may be limited by the number of training images that are available. Meta-learning rate $\alpha$ and learning rate $\eta$ are selectable and are not limited to any particular values or required to be the same value.

Figure 3:
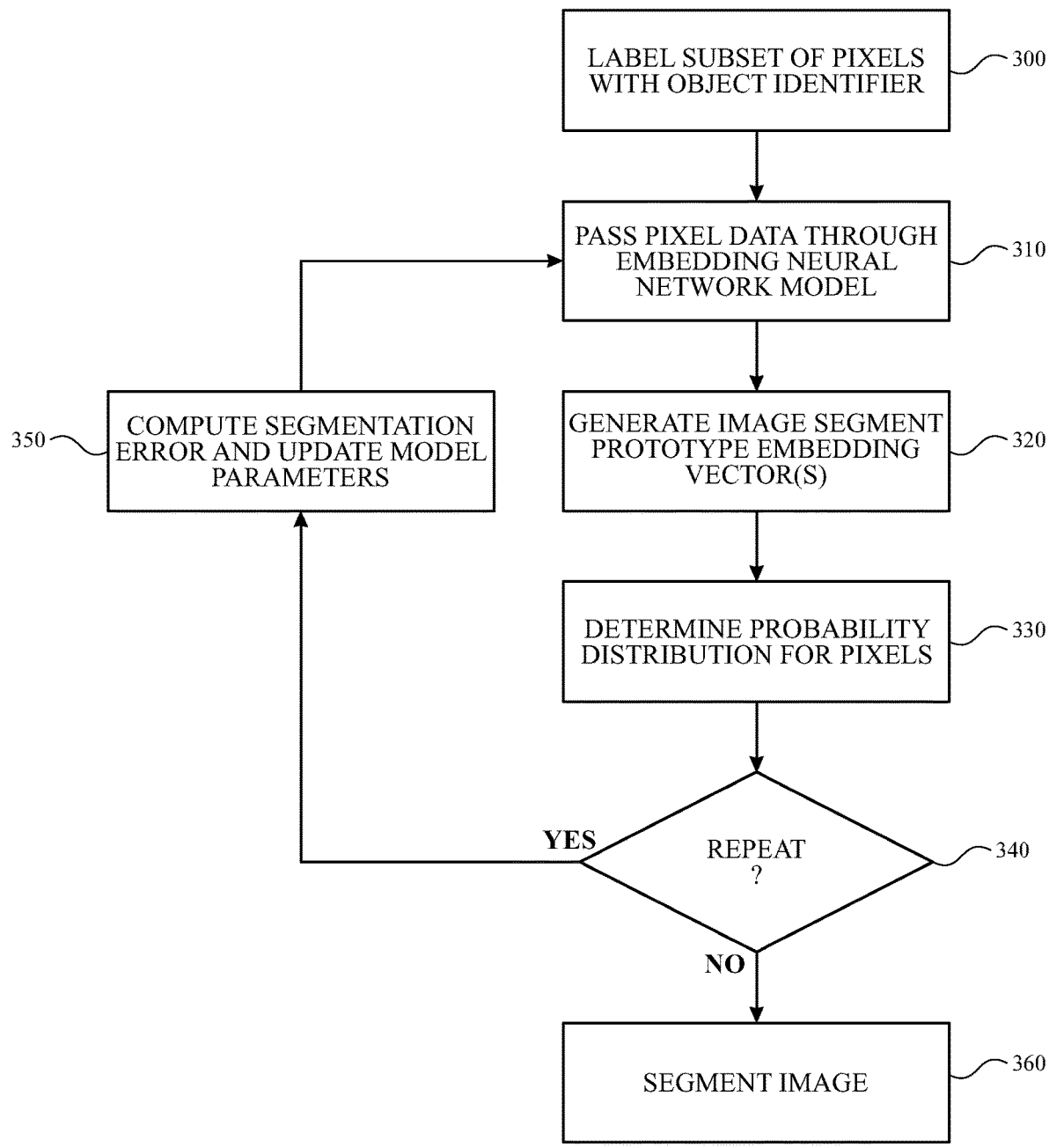
FIG. 3 is a flowchart illustrating a process for adapting an initialized neural network model to an image segmentation task according to aspects of the subject technology.
Figure 4A:
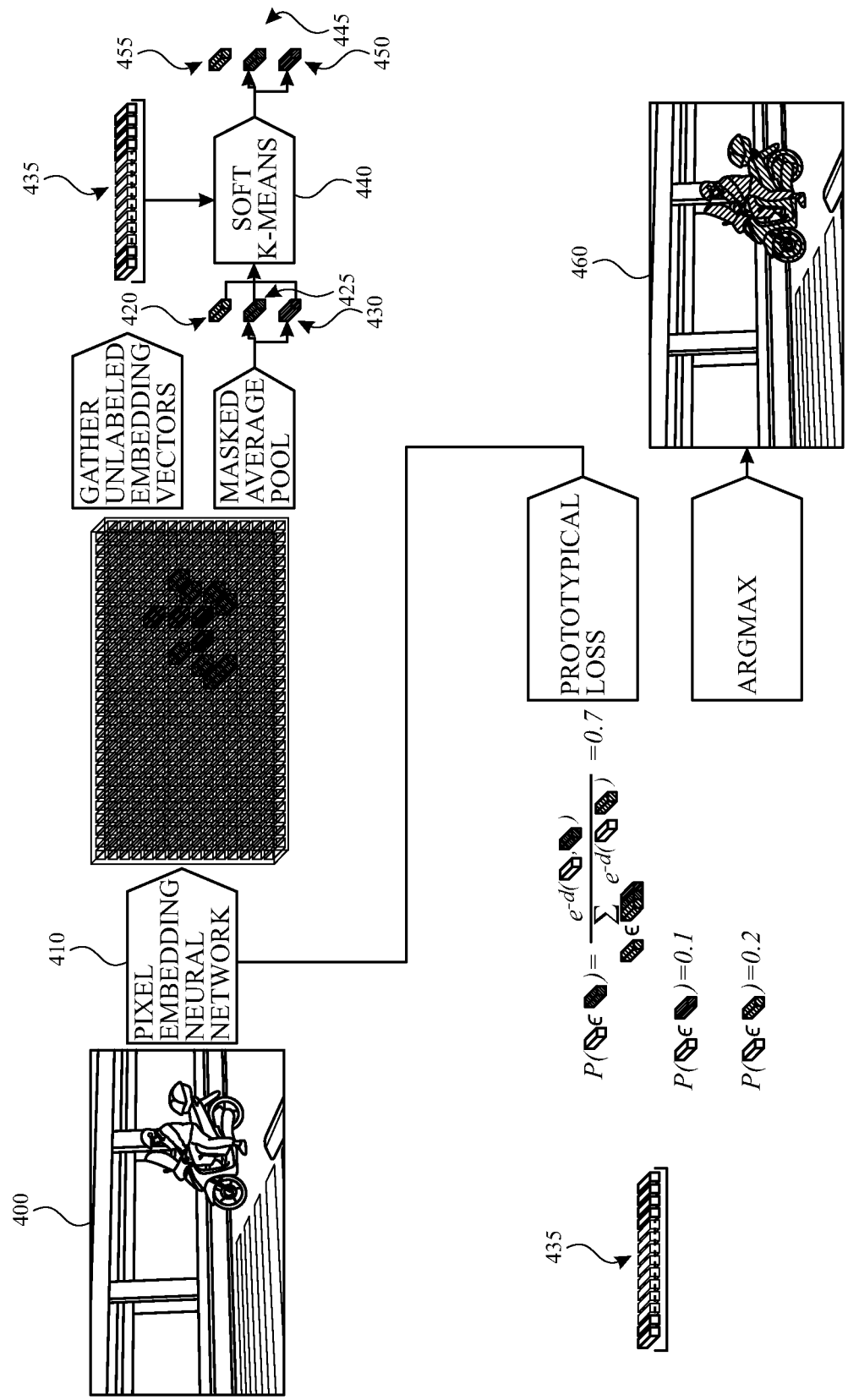
FIGS. 4A and 4B are illustrations of neural network model adaptation processes according to aspects of the subject technology.

The Metric Meta-Learning Algorithm outlined above generates model parameters used to initialize an embedding neural network model that is quickly adaptable to a new image segmentation task. The initialized embedding neural network model may be deployed for use on a wide range of computing devices. As noted above, the initialized embedding neural network model may be adapted by an adaptation module executed by a computing device to adapt to segment a new image. FIG. 3 is a flowchart illustrating a process for adapting an initialized neural network model to a new image segmentation task according to aspects of the subject technology. For explanatory purposes, the blocks of the process are described herein as occurring in serial, or linearly. However, multiple blocks of the process may occur in parallel. In addition, the blocks of the process need not be performed in the order shown and/or one or more blocks of the process need not be performed and/or can be replaced by other operations. FIG. 4A is an illustration of an adaptation process that will be referenced below in the discussion of the flowchart in FIG. 3.

The process begins with an image that has been selected for segmentation. For example, image 400 in FIG. 4A is an image containing a motorcycle and a rider that a user has selected to segment the motorcycle and the rider in the image. Image 400 is composed of a number of pixels where each pixel is represented by pixel data. The pixel data may include the position of the pixel within image 400 and intensity values for each color in a set of colors, such as red, green, and blue. The subject technology is not limited to these examples of pixel data and, in other aspects, may include other types of data such as depth information.

To define the segmentation task for the selected image, a user may interact with the image displayed on a graphical user interface to select one or more pixels in the image that correspond to the object or objects the user wishes to segment in the image. For example, the user may contact a touchscreen displaying the image with a finger or stylus to select the pixels coincident with the contact points on the touchscreen. In other aspects the user may use a pointing device to move a cursor to select pixels in the displayed image. Other selection mechanisms may be used to supplement or in place of selecting pixels with user touch or tap on the displayed graphical user interface. For example, box annotations made by a user may select the pixels that correspond to the object to be segmented within the displayed image. Another algorithm may process the selected image before the adaptation process of FIG. 3 and produce a selection of pixels in the image. The algorithm's selection of pixels may be confirmed by the user or may be supplemented by the user before proceeding with the adaptation process.

Returning to FIG. 3, the selected pixels forming a first subset of the pixels of the image, are labeled with an object identifier or class c (block 300). More than one object may be identified for segmentation by the user, with the pixels corresponding to each respective object be labeled with a unique object identifier. For example, the selected pixels corresponding to the motorcycle in image 400 may be labeled with one object identifier and the selected pixels corresponding to the rider in image 400 may be labeled with a second object identifier. Alternatively, the selected pixels for both the motorcycle and the rider may be labeled with a single object identifier if that is the segmentation task desired by the user.

According to aspects of the subject technology, the image segmentation task defined by the user selected pixels is processed as a few-shot pixelwise classification process where the labeled pixels form the sub dataset $\mathbb{D}^{support}$ and the unlabeled pixels form the sub dataset $\mathbb{D}^{query}$. According to aspects of the subject technology using prototypical networks, the pixel data of the image is passed through the initialized embedding neural network model to generate pixel embedding vectors in an embedding space according to embedding function $f_\phi$ implemented in the model (block 310). For example, FIG. 4A illustrates image 400 being passed through pixel embedding neural network model 410 to generate pixel embedding vectors 420. The pixel embedding vectors corresponding to the labeled pixels in image 400 are highlighted in the depicted pixel embedding vectors 420.

A prototype embedding vector $z_c$ may be generated for each object identifier or class c using Equation (1) presented above (block 320). For example, FIG. 4A depicts prototype embedding vector 425 corresponding to the object identifier associated with the motorcycle image segment in image 400 and prototype embedding vector 430 corresponding to the rider image segment in image 400. Using the generated prototype embedding vectors, a probability distribution over all of the object identifiers may be determined for the elements of $\mathbb{D}^{query}$ using Equation (2) presented above (block 330). For example, in FIG. 4A the pixel embedding vectors 435 corresponding to the unlabeled pixels in image 400 may be gathered and a probability may be determined for each pixel embedding vector representing the pixels $\mathbb{D}^{query}$ whether the pixel should be labeled with an object identifier or class c. The distribution includes a probability for each object identifier or class c used to label pixels in the image.

The subject technology may use a distractor to label the pixels in the image that do not correspond to any of the objects to be segmented in the image. The distractor may be represented by a distractor prototype in the embedding space, depicted as distractor prototype vector 440 in FIG. 4A. The distractor prototype may be initialized as the zero vector in the embedding space with a learnable radius. Other examples of distractor prototypes may be used instead of the zero vector in the embedding space. The distractor is included in the probability distribution with the object identifiers or classes.

The subject technology may take advantage of semi-supervised learning and use the pixel embedding vectors corresponding to the unlabeled pixels to update the prototype embedding vector for each object identifier or class c and the distractor prototype vector. For example, a soft k-means update maybe computed using the following equation:

$$\tilde{z}_c = \frac{|\mathbb{D}_c^{support}| \cdot z_c + \sum_{(x_i, y_i) \in \mathbb{D}} p_\phi(y_i = c | x_i) \cdot f_\phi(x_i)}{|\mathbb{D}_c^{support}| + \sum_{(x_i, y_i) \in \mathbb{D}} p_\phi(y_i = c | x_i)} \quad (4)$$

The updated prototype embedding vectors $\tilde{z}_c$ may then be used in Equation (2) to update the probability distributions. The updated prototype embedding vectors 445 and 450 and the updated distractor prototype vector 455 are depicted in FIG. 4A.

Blocks 310 through 330 outlined above may be performed repeatedly over a number of iterations. For example, the number of iterations used for the inner loop in the initialization process discussed above may represent the number of iterations used to adapt the embedding neural network model to the particular segmentation task. The process may determine which iteration has been completed and whether another iteration should be performed (block 340). The number of iterations to be performed may be a predetermined number, such as four, or may rely on a metric to determine if another iteration should be performed. If another iteration is to be performed, the segmentation error or metric learning loss J($\phi$) may be determined using Equation (3) presented above, and the parameters of the embedding neural network model may be trained and updated based on minimizing the metric learning loss (block 350). This is represented with the Prototypical Loss function block included in FIG. 4A. For each of the iterations, a linear combination of the probabilities in the probability distribution may be used when determining the metric learning loss J($\phi$) as a soft update. Blocks 310 through 340 are repeated using the updated embedding neural network model.

If no more iterations are to be performed (block 340), the process proceeds to segmentation of the image by segmenting the pixels in the image based on the last probability distribution determined for each of the unlabeled pixels (block 360). For example, each unlabeled pixel may be labeled with the object identifier or class, or the distractor, based on which has the highest probability in the probability distribution. This is represented by the Argmax function block depicted in FIG. 4A. Other mechanisms may be used to select the label for the unlabeled pixel embedding vectors. The image pixels are segmented or grouped based on the labels. The segmenting may be depicted by shading the groups of pixels in the displayed image, such as depicted in image 460 of FIG. 4A.

Segmentation of the image may include further processing of the image in connection with other applications. For example, segmentation may include editing the image to remove the pixels that are not labeled with the object identifier or class. In this manner, the background of the segmented object may be removed from the image. The edited image may then be stored in storage media for selection and insertion in a document, presentation, or other type of media file by another application.

The segmented image may be stored in storage media leaving the object identifier or class labels as well as the distractor labels intact. Another application such as a photo editor or graphics editor may access the stored segmented image and utilize the pixel labels to guide different types of processing corresponding to the different labels to visually distinguish the segmented object or objects from the rest of the image.

Using the initialized embedding neural network model allows rapid adaptation to an image segmentation task defined by user interactions with a displayed image. Using only a small number of iterations to adapt the model to the particular task provides a near real-time experience for the user in segmenting an image based on the user identifying the objects to be segmented in the image. Using few-shot learning using the displayed image for the training data reduces the amount of data needed on a particular computing device to train or adapt the model and fewer training iterations reduces the amount of processing cycles consumed.

Figure 4B:
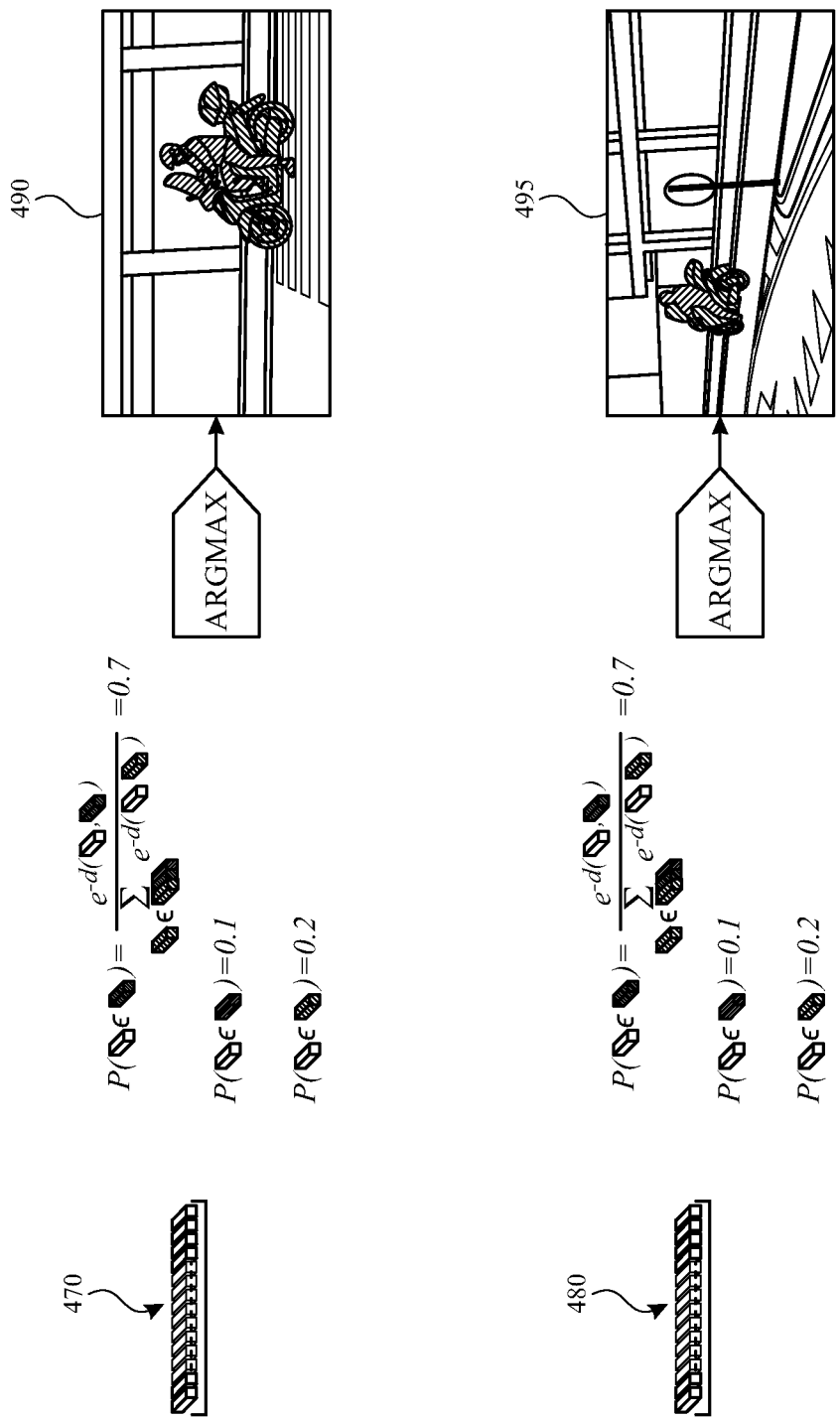

The foregoing examples described the segmentation of a single image. The subject technology may be adapted for segmentation of objects depicted in video data. Treating video data as a sequence of multiple images the process discussed above with respect to FIGS. 3 and 4A could be used to adapt the embedding neural network model for segmenting one or more objects with respect to one frame or image of the video data. The adapted embedding neural network model could then be employed to segment the same objects on subsequent frames or images in the sequence video data. For example, FIG. 4B depicts the segmentation of two frames of video data that follow a frame of the video data corresponding to image 400 in FIG. 4A. The pixels corresponding to the two frames of video data are passed through the adapted embedding neural network model and pixel embedding vectors corresponding to the unlabeled pixels of the two frames are gathered and represented as pixel embedding vectors 470 and 480. Similar to the process discussed above, probabilities are determined for each of the pixel embedding vectors as to whether the corresponding unlabeled pixel should be labeled with one of the objection identifiers or the distractor. Because the embedding neural network model was adapted to the particular image segmentation task, only a single iteration may be used and the unlabeled pixels may be labeled based on the object identifier or distractor that has the highest probability for that pixel. The two frames of video data may then be segmented to produce images 490 and 495 in FIG. 4B. According to aspects of the subject technology, the adaptation process of the embedding neural network model may be performed using more than one image in the sequence that includes pixels labeled by the user to improve the accuracy of the model.

The pixel labeling processes of the subject technology described above may be used to provide a type of pixelwise tracking between images in a sequence of images making up the video. The pixelwise tracking may facilitate tracking the location and movement of the segmented object or objects within surroundings captured by the video data using the pixel labels made by the foregoing processes. A video editing application may alter the visual appearance of the pixels labeled with the object identifier or class in each image in the sequence of images to visually identify the location of the segmented object. The video editing application may apply other types of image processing to the images in the sequence of images based on the pixel labels.

Figure 5:
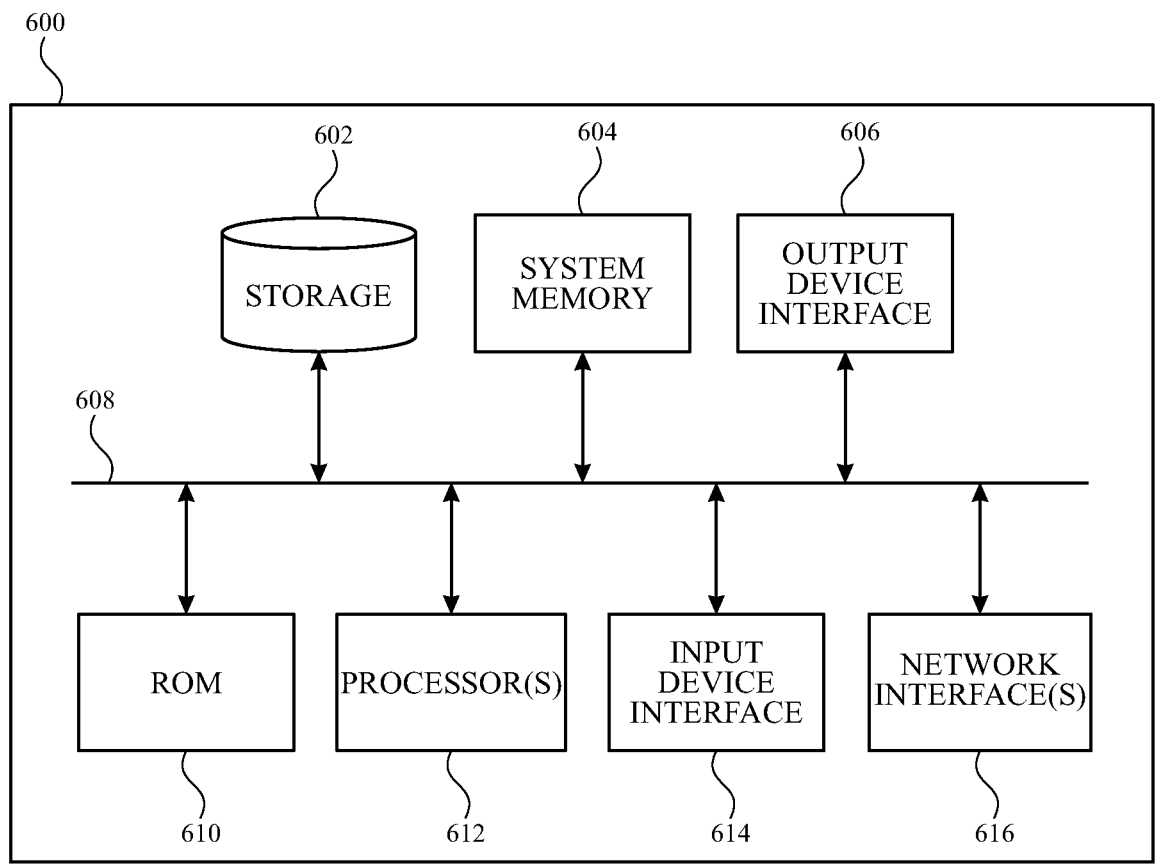
FIG. 5 illustrates an example of a computer system with which aspects of the subject technology may be implemented.

FIG. 5 illustrates an electronic system 500 with which one or more implementations of the subject technology may be implemented. The electronic system 500 can be, and/or can be a part of, server 110 and/or computing device 120 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the computing device 120 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized as computer program products comprising code in a tangible computer-readable storage medium (or multiple tangible computer-readable storage media of one or more types) encoding one or more instructions of the code. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or segmented in a different way) all without departing from the scope of the subject technology.

Aspects of the present technology may include the gathering and use of data available from specific and legitimate sources to train neural network models and to apply to trained neural network models deployed in systems. The present disclosure contemplates that in some instances, this gathered data may include personal information data that uniquely identifies or can be used to identify a specific person. Such personal information data can include metadata or other data associated with images that may include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to train a neural network model for better image segmentation performance. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of training data collection, the present technology can be configured to allow users to select to "opt in" or "opt out" of participation in the collection of personal information data during registration for services or anytime thereafter. In another example, users can select not to provide mood-associated data for use as training data. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, training data can be selected based on aggregated non-personal information data or a bare minimum amount of personal information, such as the content being handled only on the user's device or other non-personal information available to as training data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   labeling a first subset of pixels of an image with a first object identifier based on labeling information associated with the image;
   passing pixel data representing the pixels of the image through an embedding neural network model comprising learned parameters to generate a plurality of pixel embedding vectors corresponding to the pixels of the image;
   generating a first embedding vector associated with the first object identifier based on pixel embedding vectors corresponding to the first subset of pixels;
   for each pixel of a second subset of pixels of the image, determining a probability that the pixel should be labeled with the first object identifier based on the first subset of the pixels wherein the probability for each pixel of the second subset of pixels is determined based on the first embedding vector and pixel embedding vectors corresponding to the second subset of pixels;
   labeling one or more pixels in the second subset of pixels with the first object identifier based on the determined probabilities; and segmenting the pixels in the image into a plurality of segments based on the pixels of the image labeled with the first object identifier.

2. The method of claim 1, wherein the labeling information comprises user contact points with a graphical user interface displaying the image, and
wherein the first subset of pixels corresponds to pixels in the displayed image coincident with the user contact points.

3. The method of claim 1, wherein the learned parameters of the embedding neural network model comprise meta-learned initialized parameters, and wherein the first embedding vector is a first prototype embedding vector.

4. The method of claim 3, wherein generating the first prototype embedding vector associated with the first object identifier comprises:
generating an initial prototype embedding vector based on the pixel embedding vectors corresponding to the first subset of pixels; and
updating the initial prototype embedding vector based on the pixel embedding vectors corresponding to the second subset of pixels to generate the first prototype embedding vector.

5. The method of claim 4, further comprising:
updating the parameters of the embedding neural network model based on a loss function associated with the determined probabilities for the second subset of pixels;
passing the pixel data through the embedding neural network model with the updated parameters; and
repeating the steps of generating a first prototype embedding vector, and determining a probability for each pixel of the second subset of pixels,
wherein the one or more pixels in the second subset of pixels are labeled with the first object identifier after the repeating of the steps.

6. The method of claim 3, further comprising:
labeling a third subset of the pixels with a second object identifier based on the labeling information associated with the image;
generating a second prototype embedding vector associated with the second object identifier based on pixel embedding vectors corresponding to the third subset of pixels; and
for each pixel of a second subset of pixels of the image, determining a probability that the pixel should be labeled with the second object identifier based on the second prototype embedding vector and the embedded vectors corresponding to the second subset of the pixels,
wherein the one or more pixels in the second subset pixels are labeled with either the first object identifier or the second object identifier based on the determined probabilities, and
wherein the pixels in the image are segmented into the plurality of segments based on the pixels in the image labeled with the first object identifier and the second object identifier.

7. The method of claim 1, further comprising:
for each of a first number of loops:
selecting a labeled image from a set of training images;
designating a first subset of pixels of the selected training image and a second subset of pixels of the selected training image, wherein labels associated with the second subset of pixels are hidden;
passing pixel data representing the pixels of the training image through the embedding neural network model to generate a plurality of pixel embedding vectors corresponding to the pixels of the training image;
generating a training prototype embedding vector associated with a training label associated with the first subset of pixels based on pixel embedding vectors corresponding to the first subset of pixels of the training image;
for each pixel of the second subset of pixels, determining a probability that the pixel should be labeled with the training label based on the training prototype embedding vector;
updating the parameters of the embedding neural network model based on the determined probabilities; and
repeating the selecting, designating, passing, generating, determining, and updating steps above for a second number of loops; and
generating the initialized parameters for the embedding neural network model based on a set of parameters updated in each of the first number of loops.

8. The method of claim 7, wherein for each loop of the first number of loops a percentage of the total number of pixels of the selected training image designated for the first subset of pixels is different from a percentage applied during another loop of the first number of loops.

9. A system, comprising:
a processor; and
a memory device containing instructions which, when executed by the processor, cause the processor to:
receive user interaction data comprising user contact points with a graphical user interface displaying an image;
label a first subset of pixels of the image with an object identifier, wherein the first subset of pixels correspond to pixels in the displayed image coincident with the user contact points;
pass pixel data representing pixels of the image through an embedding neural network model comprising meta-learned initialized parameters to generate a plurality of pixel embedding vectors corresponding to the pixels of the image;
generate a prototype embedding vector associated with the object identifier based on pixel embedding vectors corresponding to the first subset of pixels;
for each pixel of a second subset of pixels of the image, determine a probability that the pixel should be labeled with the object identifier based on the prototype embedding vector and pixel embedding vectors corresponding to the second subset of pixels;
label one or more pixels in the second subset of pixel embedding vectors with the object identifier based on the determined probabilities; and
segment the pixels in the image into a plurality of segments based on the pixels of the image labeled with the object identifier.

10. The system of claim 9, wherein to generate the prototype embedding vector the instructions, when executed by the processor, cause the processor to:
generate an initial prototype embedding vector based on the pixel embedding vectors corresponding to the first subset of pixels; and
update the initial prototype embedding vector based on the pixel embedding vectors corresponding to the second subset of pixels to generate the prototype embedding vector.

11. The system of claim 10, wherein the instructions, when executed by the processor, further cause the processor to:
- update the parameters of the embedding neural network model based on a loss function associated with the determined probabilities for the second subset of pixels;
- pass the pixel data through the embedding neural network model with the updated parameters; and
- repeat the instructions to pass the pixel data through the embedding neural network model, to generate a prototype embedding vector, and to determine a probability a predetermined number of times,
- wherein the one or more pixels in the second subset of pixels are labeled with the object identifier after the repeating the instructions.

12. The system of claim 11, wherein a probability for each pixel of the second subset of pixels is determined for the object identifier and a distractor represented by a distractor prototype, and
- wherein the one or more pixels of the second subset of pixels are labeled with either the object identifier or the distractor based on the determined probabilities.

13. The system of claim 12, wherein the instructions, when executed by the processor, further cause the processor to:
- for each of a first number of loops:
  - select a labeled image from a set of training images;
  - designate a first subset of pixels of the selected training image and a second subset of pixels of the selected training image, wherein labels associated with the second subset of pixels are hidden;
  - pass pixel data representing the pixels of the selected training image through the embedding neural network model to generate a plurality of pixel embedding vectors corresponding to the pixels of the selected training image;
  - generate a training prototype embedding vector associated with a training label associated with the first subset pixels based on the pixel embedding vectors corresponding to the first subset of pixels;
  - for each pixel of the second subset of pixels, determine a probability that the pixel should be labeled with the training label based on the training prototype embedding vector and pixel embedding vectors corresponding to the second subset of pixels;
  - update the parameters of the embedding neural network model based on the determined probabilities; and
  - repeat the instructions to select, designate, pass, generate, determine, and update above for a second number of loops; and
- generate the initialized parameters for the embedding neural network model based on the updated parameters generated in each of the first number of loops.

14. A computer program product comprising code stored in a non-transitory tangible computer-readable storage medium, the code comprising: code for labeling a first subset of pixels of an image based on user interactions with the image; code for passing pixel data representing the pixels of the image through an embedding neural network model comprising meta-learned initialized parameters to generate a plurality of pixel embedding vectors corresponding to the pixels of the image; code for generating an initial prototype embedding vector based on the pixel embedding vectors corresponding to the first subset of pixels; and code for updating the initial prototype embedding vector based on pixel embedding vectors corresponding to a second subset of pixels to generate a first prototype embedding vector; code for determining, for each pixel of the second subset of pixels, a probability that the pixel should be labeled with the first object identifier based on the first prototype embedding vector and the pixel embedding vectors corresponding to the second subset of pixels; code for labeling one or more of second subset of pixels with the first object identifier based on the determined probabilities; and code for segmenting the pixels in the image into a plurality of segments based on the pixels of the image labeled with the first object identifier.

15. The computer program product of claim 14, wherein the code for segmenting the pixels in the image into a plurality of segments comprises:
- code for editing the pixel data of the image based on the pixels labeled with the first object identifier; and
- code for storing the edited image in storage media.

16. The computer program product of claim 15, wherein editing the pixel data of the image comprises removing pixels that are not labeled with the first object identifier from the image.

17. The computer program product of claim 15, wherein editing the pixel data of the image comprises editing the pixel data to alter a visual appearance of the pixels labeled with the first object identifier in the image.

18. The computer program product of claim 14, wherein the computer program product further comprises:
- code for updating the parameters of the embedding neural network model based on a loss function associated with the determined probabilities for the pixels of the second subset of pixels;
- code for passing the pixel data representing the pixels of the displayed image through the embedding neural network model with the updated parameters; and
- code for repeating the steps of generating a prototype embedding vector, and determining a probability for each pixel of the second subset of pixels,
- wherein the one or more pixel embedding vectors in the second subset of the plurality of pixel embedding vectors are labeled with the first object identifier after the repeating of the steps.

19. The computer program product of claim 14, wherein the computer program product further comprises:
- code for labeling a third subset of the pixels with a second object identifier based on the user interactions with the image;
- code for generating a second prototype embedding vector associated with the second object identifier based on pixel embedding vectors corresponding with the third subset of pixels; and
- code for determining, for each pixel of the second subset of pixels, a probability that the pixel should be labeled with the second object identifier based on the second prototype embedding vector and the pixel embedding vectors corresponding to the second subset of pixels,
- wherein the one or more pixels in the second subset of pixels are labeled with either the first object identifier or the second object identifier based on the determined probabilities.

20. The computer program product of claim 14, wherein the computer program product further comprises:
- for each of a first number of loops:
  - code for selecting a labeled image from a set of training images;
  - code for designating a first subset of pixels of the selected training image and a second subset of pixels of the selected training image, wherein labels associated with the second subset of pixels are hidden;

code for passing pixel data representing the pixels of the training image through the embedding neural network model to generate a plurality of pixel embedding vectors corresponding to the pixels of the training image;

code for generating a training prototype embedding vector associated with a training label associated with the first subset of pixels based on pixel embedding vectors corresponding to the first subset of pixels of the training image;

code for determining, for each pixel of the second subset of pixels, a probability that the pixel should be labeled with the training label based on the training prototype embedding vector;

code for updating the parameters of the embedding neural network model based on the determined probabilities; and code for repeating the selecting, designating, passing, generating, determining, and updating steps above for a second number of loops; and code for generating the initialized parameters for the embedding neural network model based on a set of parameters updated in each of the first number of loops.

\* \* \* \* \*

UNITED STATES PATENT AND TRADEMARK OFFICE
CERTIFICATE OF CORRECTION

PATENT NO. : 11,887,310 B2
APPLICATION NO. : 17/078086
DATED : January 30, 2024
INVENTOR(S) : Vignesh Jagadeesh et al.

Page 1 of 2

It is certified that error appears in the above-identified patent and that said Letters Patent is hereby corrected as shown below:

On the Title Page (Other Publications):

On Page 2, Column 1, Lines 21-22: "Ccntrc, Sydncy, Australia," should read --Centre, Sydney, Australia,--.

On Page 2, Column 1, Line 22: "PMLR. Rctricved from" should read --PMLR. Retrieved from--.

On Page 2, Column 1, Line 44: "2017 rctricved from" should read --2017 retrieved from--.

On Page 2, Column 1, Line 45: "11 pagcs." should read --11 pages.--.

On Page 2, Column 1, Line 51: "14 pagcs." should read --14 pages.--.

On Page 2, Column 2, Line 9: "2018, rctricved from" should read --2018, retrieved from--.

On Page 2, Column 2, Line 10: "13 pagcs." should read --13 pages.--.

On Page 2, Column 2, Lines 40-41: "papcrs.nips.cc/papcr/6996-prototypical-nctworks-for-fcw-shot-lcarning.pdf." should read --papers.nips.cc/paper/6996-prototypical-networks-for-few-shot-learning.pdf.--.

On Page 2, Column 2, Line 57: "Alignment," Thc IEEE Intcrnational Confcrcncc on" should read --Alignment," The IEEE International Conference on--.

On Page 2, Column 2, Line 58: "10 pagcs." should read --10 pages.--.

On Page 2, Column 2, Line 65: "Zhou, ct al., "Lcarning With" should read --Zhou, et al., "Learning With--.

Signed and Sealed this
Thirtieth Day of April, 2024

Katherine Kelly Vidal
*Director of the United States Patent and Trademark Office*

CERTIFICATE OF CORRECTION (continued)
U.S. Pat. No. 11,887,310 B2

On Page 2, Column 2, Lines 65-66: "Global Consistency," Advanccs in Ncural Information" should read --Global Consistency," Advances in Neural Information--.

In the Claims

Column 16, Line 61 (Claim 1): "the pixels wherein" should read --the pixels, wherein--.